(12) United States Patent
Yasukawa et al.

(10) Patent No.: US 10,959,186 B2
(45) Date of Patent: Mar. 23, 2021

(54) USER EQUIPMENT

(71) Applicant: NTT DOCOMO, INC., Tokyo (JP)

(72) Inventors: Shinpei Yasukawa, Tokyo (JP); Kazuki Takeda, Tokyo (JP); Satoshi Nagata, Tokyo (JP); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,144

(22) PCT Filed: May 2, 2017

(86) PCT No.: PCT/JP2017/017302
§ 371 (c)(1),
(2) Date: Oct. 28, 2019

(87) PCT Pub. No.: WO2018/203403
PCT Pub. Date: Nov. 8, 2018

(65) Prior Publication Data
US 2020/0100188 A1 Mar. 26, 2020

(51) Int. Cl.
*H04W 52/04* (2009.01)
*H04W 52/24* (2009.01)
(Continued)

(52) U.S. Cl.
CPC ........ *H04W 52/242* (2013.01); *H04B 7/2643* (2013.01); *H04W 52/325* (2013.01); *H04W 72/042* (2013.01)

(58) Field of Classification Search
CPC ............ H04W 52/242; H04W 52/325; H04W 72/046; H04B 7/26443
(Continued)

(56) References Cited

U.S. PATENT DOCUMENTS 8,738,067 B2 * 5/2014 Lee ..................... H04W 52/242
455/522
9,191,930 B2 * 11/2015 Papasakellariou ..........................
H04W 72/0446
(Continued)

FOREIGN PATENT DOCUMENTS

JP 2016-115950 A 6/2016
WO 2013/165286 A1 11/2013
(Continued)

OTHER PUBLICATIONS

International Search Report issued in PCT/JP2017/017301 dated Jul. 4, 2017 (4 pages).
(Continued)

*Primary Examiner* — Hai V Nguyen
(74) *Attorney, Agent, or Firm* — Osha Bergman Watanabe & Burton LLP

(57) ABSTRACT

A user equipment for performing radio communication with a base station in accordance with dynamic TDD (Time Division Duplex) is disclosed. An aspect of the present invention relates to a user equipment including a transmission and reception unit that transmits a radio signal to and receives a radio signal from a base station in accordance with dynamic TDD; and a transmission power configuration unit that configures uplink transmission power toward the base station, wherein the transmission power configuration unit configures the uplink transmission power in accordance with a dedicated scheme, a group common scheme or a combined scheme of the dedicated scheme and the group common scheme.

6 Claims, 15 Drawing Sheets

(51) Int. Cl.
  *H04B 7/26* (2006.01)
  *H04W 52/32* (2009.01)
  *H04W 72/04* (2009.01)

(58) Field of Classification Search
  USPC .................................................. 455/522, 69
  See application file for complete search history.

(56) References Cited

U.S. PATENT DOCUMENTS

| | | | |
|---|---|---|---|
| 9,397,796 B2 * | 7/2016 | Papasakellariou | H04L 1/1861 |
| 9,794,887 B2 * | 10/2017 | Ouchi | H04W 52/18 |
| 10,117,192 B2 * | 10/2018 | Takeda | H04W 52/228 |
| 10,149,258 B2 * | 12/2018 | Yokomakura | H04W 72/0473 |
| 10,187,882 B2 * | 1/2019 | Kusashima | H04L 5/0055 |
| 10,212,711 B2 * | 2/2019 | Lee | H04W 52/383 |
| 10,314,078 B2 * | 6/2019 | Ouchi | H04W 74/0833 |
| 10,425,900 B2 * | 9/2019 | Liu | H04W 52/10 |
| 10,477,487 B2 * | 11/2019 | Ouchi | H04W 52/18 |
| 10,548,096 B2 * | 1/2020 | Papasakellariou | H04W 52/242 |
| 10,660,077 B2 * | 5/2020 | Molavianjazi | H04W 52/346 |
| 2011/0201378 A1 * | 8/2011 | Lee | H04W 52/243 455/522 |
| 2014/0269452 A1 * | 9/2014 | Papasakellariou | H04W 72/0406 370/280 |
| 2014/0269453 A1 * | 9/2014 | Papasakellariou | H04L 1/1854 370/280 |
| 2015/0358914 A1 * | 12/2015 | Song | H04W 52/146 370/280 |
| 2016/0028512 A1 * | 1/2016 | Papasakellariou | H04W 72/0446 370/330 |
| 2016/0066312 A1 * | 3/2016 | Centonza | H04W 72/046 370/329 |
| 2016/0066330 A1 * | 3/2016 | Centonza | H04W 72/0446 370/329 |
| 2016/0157191 A1 * | 6/2016 | Yokomakura | H04W 52/365 370/252 |
| 2016/0337984 A1 * | 11/2016 | Takeda | H04W 52/08 |
| 2017/0202025 A1 * | 7/2017 | Ouchi | H04W 52/346 |
| 2017/0238287 A1 * | 8/2017 | Kusashima | H04W 72/042 370/280 |
| 2017/0245282 A1 * | 8/2017 | Lee | H04W 72/0473 |
| 2018/0014257 A1 * | 1/2018 | Ouchi | H04W 52/242 |
| 2018/0069685 A1 * | 3/2018 | Yang | H04W 52/242 |
| 2019/0104549 A1 * | 4/2019 | Deng | H04B 7/0617 |
| 2019/0387479 A1 * | 12/2019 | Gong | H04W 52/242 |
| 2020/0053657 A1 * | 2/2020 | Molavianjazi | H04W 52/346 |
| 2020/0053710 A1 * | 2/2020 | Molavianjazi | H04L 5/0048 |
| 2020/0053724 A1 * | 2/2020 | Molavianjazi | H04W 52/346 |
| 2020/0053800 A1 * | 2/2020 | Deng | H04L 5/0048 |

FOREIGN PATENT DOCUMENTS

| | | |
|---|---|---|
| WO | 2014/148786 A1 | 9/2014 |
| WO | 2015/005334 A1 | 1/2015 |

OTHER PUBLICATIONS

Written Opinion of the International Searching Authority issued in PCT/JP2017/017301 dated Jul. 4, 2017 (4 pages).
LG Electronics; "Indication of blank resource"; 3GPP TSG RAN WG1 Meeting NR-AH1, R1-1700498; Spokane, USA; Jan. 16-20, 2017 (3 pages).
LG Electronics; "Discussion on maximum code block size for eMBB"; 3GPP TSG RAN WG1 NR ad-hoc, R1-1700521; Spokane, USA; Jan. 16-20, 2017 (4 pages).
Extended European Search Report issued in counterpart European Patent Application No. 17908460.3, dated Nov. 2, 2020 (13 pages).

\* cited by examiner

FIG.1
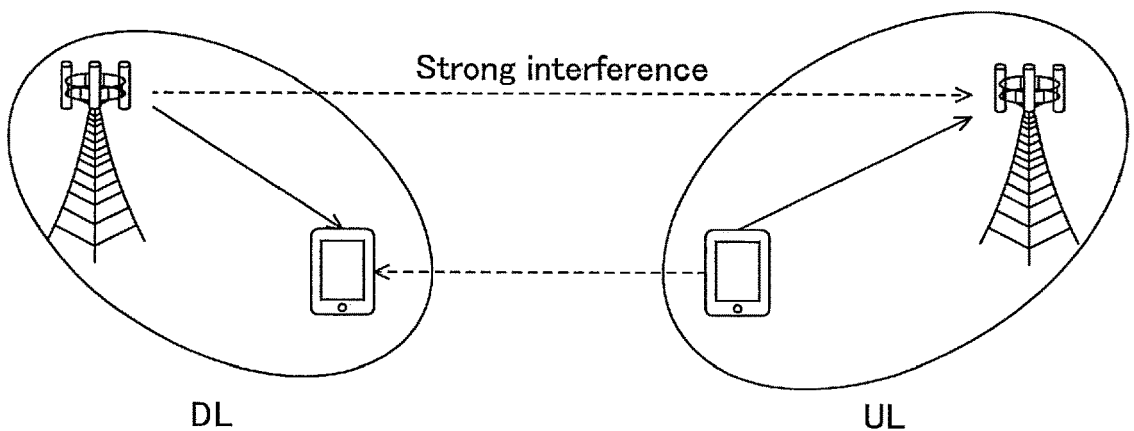
FIG.2
10
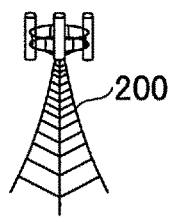
200
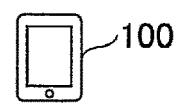

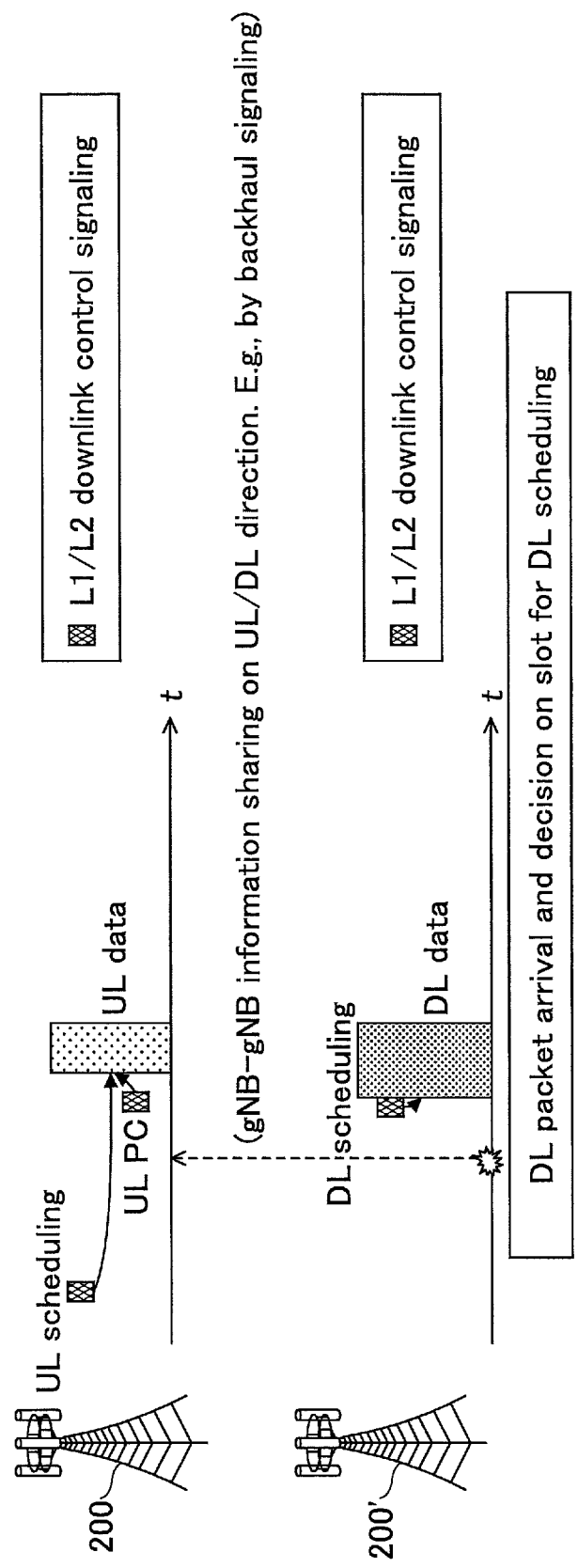

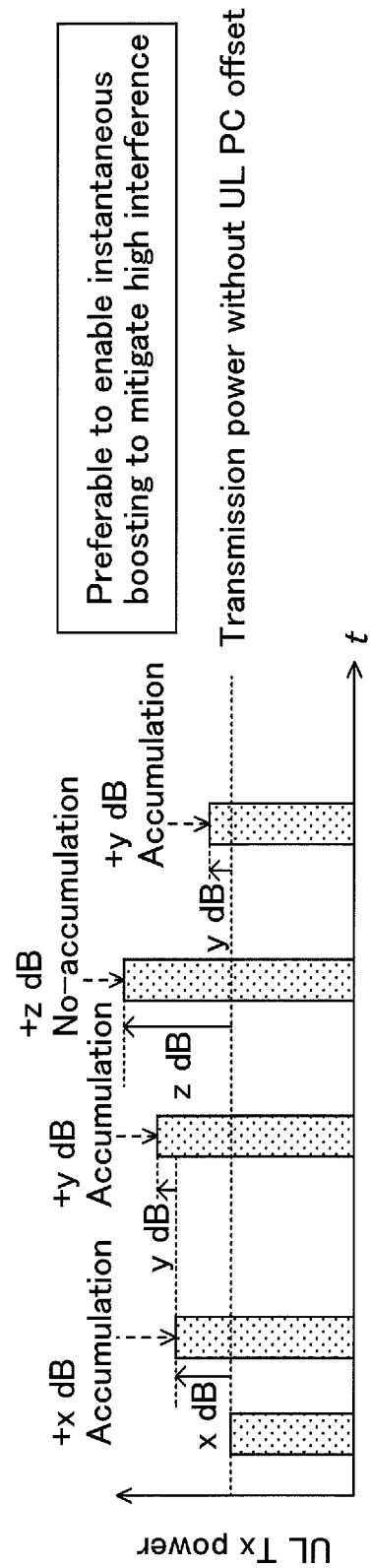

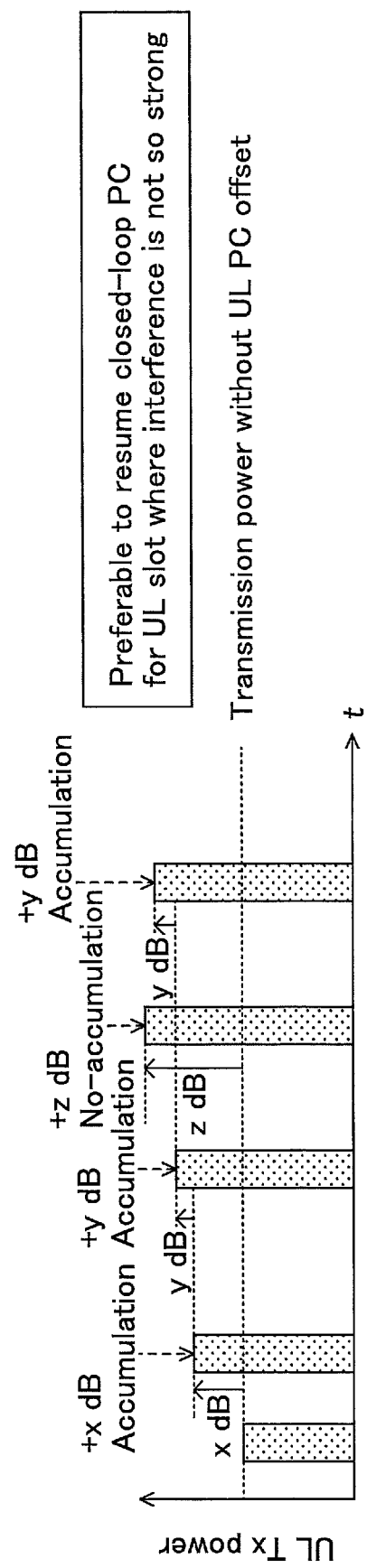

FIG.9A

UL PC PARAMETER IN CASE OF
UL TRANSMISSION MAY BE INDICATED FOR TIME BITMAP

| x | y | x | z | ... | | | | | |
|---|---|---|---|-----|---|---|---|---|---|

FIG.9B

PARAMETER APPLIED TIME INDEX MAY BE INDICATED
FOR EACH UL PC PARAMETER SET

| |
|---|
| Parameter set#1 {0, 2, ...} |
| Parameter set#2 {1, 5, ...} |
| Parameter set#3 {3, 8, ...} |

Independent UL PC parameters

UL PC parameters for UL time duration and flexible time duration

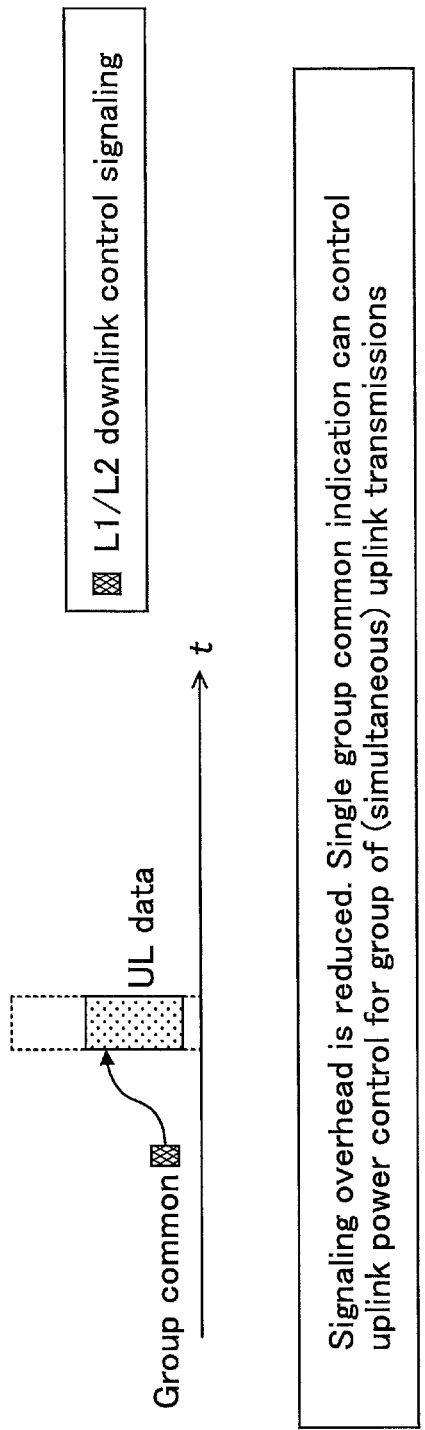

USER EQUIPMENT

TECHNICAL FIELD

The present invention relates to a radio communication system.

BACKGROUND ART

Currently, as a next one of an LTE (Long Term Evolution) system and an LTE-Advanced system, specifications for an NR (New RAT) system are drafted in 3GPP (3rd Generation Partnership Project). For the NR system, it has been studied to use dynamic TDD (Time Division Duplex) such that uplink slots and downlink slots are dynamically switched every time interval.

PRIOR ART DOCUMENT

Non-Patent Document

[Non-Patent Document 1] R1-170498
[Non-Patent Document 2] R1-170521

SUMMARY OF INVENTION

Problem to be Solved by the Invention

However, specific uplink transmission power control for such dynamic TDD has not been discussed so far.

In light of the above-described problem, an object of the present invention is to provide an uplink transmission power control technique for dynamic TDD.

Means for Solving the Problem

In order to solve the above-described problem, an aspect of the present invention relates to a user equipment including a transmission and reception unit that transmits a radio signal to and receives a radio signal from a base station in accordance with dynamic TDD (Time Division Duplex); and a transmission power configuration unit that configures uplink transmission power toward the base station, wherein the transmission power configuration unit configures the uplink transmission power in accordance with a dedicated scheme, a group common scheme or a combined scheme of the dedicated scheme and the group common scheme.

Advantage of the Invention

According to the present invention, an uplink transmission power control technique can be provided for dynamic TDD.

BRIEF DESCRIPTION OF DRAWINGS

FIG. 1 is a schematic diagram illustrating inter-adjacent cell interference in dynamic TDD.
FIG. 2 is a schematic diagram illustrating a radio communication system according to an embodiment of the present invention.
FIG. 6 is a diagram illustrating dedicated downlink control signaling according to an embodiment of the present invention.
FIG. 7 is a diagram illustrating accumulation of uplink power control offsets according to an embodiment of the present invention.
FIG. 8 is a diagram illustrating accumulation of uplink power control offsets according to an embodiment of the present invention.
FIG. 9A is a diagram illustrating an uplink power control parameter transmitted in a time domain pattern according to an embodiment of the present invention.
FIG. 9B is a diagram illustrating an uplink power control parameter transmitted in a time domain pattern according to an embodiment of the present invention.
FIG. 11 is a diagram illustrating downlink control signaling based on a group common scheme according to an embodiment of the present invention.
FIG. 10 is a diagram illustrating an uplink power control process index, which is transmitted by a group common scheme according to an embodiment of the present invention.

EMBODIMENTS OF THE INVENTION

Embodiments of the present invention are described below with reference to the drawings.

In the following embodiments, a user equipment is disclosed that executes radio communication with a base station (gNB) in accordance with dynamic TDD. In the dynamic TDD, slots in different transmission directions may be simultaneously assigned to a visited base station and an adjacent base station, respectively, and, as illustrated in FIG. 1, downlink transmission from the visited base station to which a downlink slot is assigned may cause interfere with uplink transmission toward the adjacent base station to which an uplink slot is assigned. Generally, as an uplink transmission power control scheme, there are an open-looped scheme such that a user equipment controls power based on a measured path loss, etc., and a closed-looped scheme such that a user equipment controls power based on signaling from a base station. In the embodiment described below, in dynamic TDD, a user equipment configures uplink transmission power in accordance with an uplink power control parameter for an open-looped scheme and/or a closed-looped scheme, which is transmitted by a dedicated scheme, a group common scheme, or a combined scheme of the dedicated scheme and the group common scheme in downlink control signaling. The uplink power control parameter transmitted to the user equipment is dynamically adjusted with respect to an expected interference level, and thereby occurrence of interference can be avoided in the dynamic TDD.

First, a radio communication system according to an embodiment of the present invention is described with reference to FIG. 2. FIG. 2 is a schematic diagram illustrating a radio communication system according to the embodiment of the present invention.

As illustrated in FIG. 2, the radio communication system 10 is provided with a user equipment 100 and a base station 200. The radio communication system 10 may be any radio communication system specified by 3GPP, such as an LTE system, an LTE-Advanced system and an NR system, or any other radio communication system.

The user equipment 100 is any information processing device that can communicate with the base station 200 in accordance with the dynamic TDD and may be a mobile phone, a smartphone, a tablet, a wearable device, etc., without limitation, for example.

The base station 200 executes radio communication with a large number of user equipments including the user equipment 100 under control by an upper node (not depicted), such as a core network. In the LTE system and the LTE-Advanced system, the base station 200 may be referred to as an eNB (evolved NodeB), for example. In the NR system, the base station 200 may be referred as to a gNB, for example. In the depicted embodiment, only the single base station 200 is illustrated. However, a large number of base stations are typically installed to cover a coverage range of the radio communication system 10.

Figure 3:
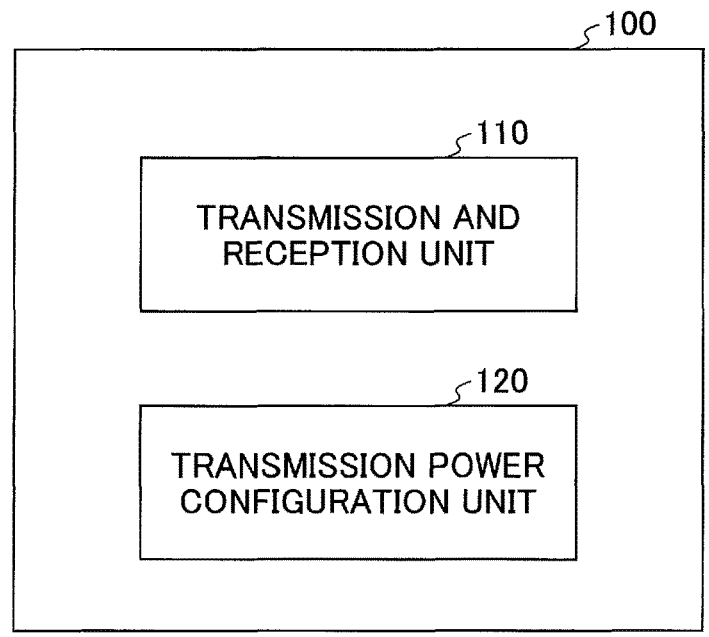
FIG. 3 is a block diagram illustrating a functional configuration of a user equipment according to an embodiment of the present invention.

Next, the user equipment according to an embodiment of the present invention is described with reference to FIG. 3. FIG. 3 is a block diagram illustrating a functional configuration of the user equipment according to the embodiment of the present invention.

As illustrated in FIG. 3, the user equipment 100 is provided with a transmission and reception unit 110 and a transmission power configuration unit 120.

The transmission and reception unit 110 transmits a radio signal to and receives a radio signal from the base station 200 in accordance with dynamic TDD. Specifically, the transmission and reception unit 110 communicates downlink/uplink control signals and downlink/uplink data signals with the base station 200. In particular, during uplink transmission, the transmission and reception unit 110 transmits an uplink radio signal to the base station 200 with uplink transmission power configured by the transmission power configuration unit 120 as described below.

The transmission power configuration unit 120 configures uplink transmission power toward the base station 200. In particular, the transmission power configuration unit 120 configures the uplink transmission power in accordance with an uplink power control parameter transmitted by the dedicated scheme, the group common scheme, or the combined scheme of the dedicated scheme and the group common scheme. Namely, while an uplink power control parameter is individually transmitted to individual user equipment in the dedicated scheme, a common uplink power control parameter is collectively transmitted to a group of user terminals in the group common scheme.

In an embodiment, an uplink power control parameter may be transmitted by L1/L2 control signaling using an open-looped uplink power control parameter index, a power offset (boosting) indicator, an uplink power control process index and/or an uplink power control time domain pattern index.

Specifically, in a transmission of an uplink power control parameter using an uplink power control parameter index, a plurality of uplink power control parameters, such as a minimum transmission power (target reception power) and a path loss compensation factor, is transmitted or broadcast by the base station 200.

In a transmission of an uplink power control parameter using a power offset (boosting) indicator, the power offset indicator associated with closed-looped power control is used for instantaneous transmission or accumulation. For each power offset indicator, a power offset for an uplink transmission may be configured by a higher layer or may be predefined. Furthermore, the transmitted offset power may or may not be accumulated.

In a transmission of an uplink power control process index, each uplink power control process index is associated with uplink power accumulation. A terminal applies the transmission power offset transmitted in the same control signal or a separate control signal for transmission power of an uplink power control process.

In a transmission of an uplink power control parameter using an uplink power control time domain pattern index, the uplink power control time domain pattern index may be configured by a higher layer or may be predefined. Furthermore, for each time domain pattern index, an uplink power control parameter may be configured by a higher layer or may be predefined. For example, an uplink power control parameter may be minimum transmission power, a path loss compensation factor, etc.

These uplink power control parameters may be implicitly transmitted by association with a report of a slot type, in addition to explicit indication using downlink control information. Signaling overhead can be reduced, for example, by configuring, by a higher layer, an uplink power control parameter #1 for a slot type #1, and configuring, by the higher layer, uplink power control parameter #2 for a slot type #2, etc.

These uplink power control parameters are transmitted to the user equipment 100 as described in detail below.

Figure 4:
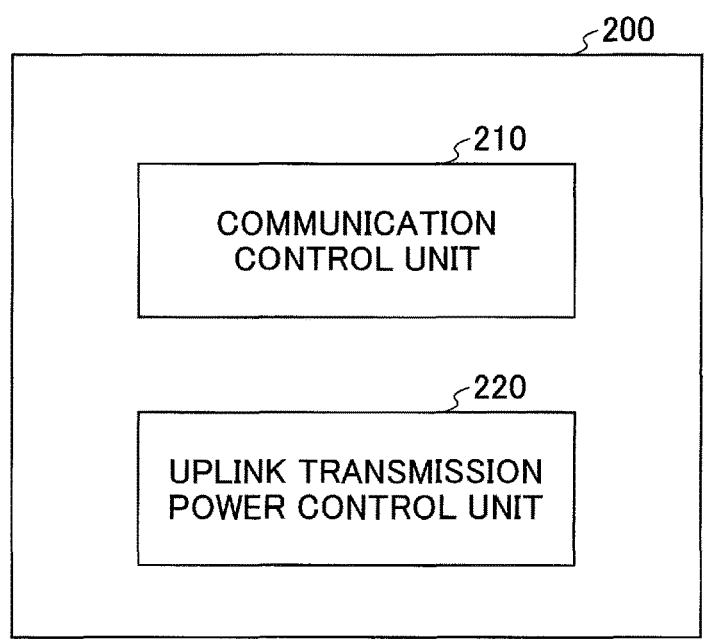
FIG. 4 is a block diagram for illustrating a functional configuration of a base station according to an embodiment of the present invention.

Next, a base station according to an embodiment of the present invention is described with reference to FIG. 4. FIG. 4 is a block diagram illustrating a functional configuration of the base station according to the embodiment of the present invention.

As illustrated in FIG. 4, the base station 200 is provided with a communication control unit 210 and an uplink transmission power control unit 220.

The communication control unit 210 controls radio communication with the user equipment 100 in accordance with dynamic TDD. Specifically, the communication control unit 210 schedules radio resources for transmission and reception of an uplink/downlink control signal and an uplink/downlink data signal and controls transmission and reception to and from the user equipment 100 in accordance with the dynamic TDD.

The uplink transmission power control unit 220 controls uplink transmission power for use in uplink transmission from the user equipment 100. Specifically, the uplink transmission power control unit 220 transmits an uplink power control parameter to the user equipment 100 in accordance with a dedicated scheme, a group common scheme or a combined scheme of the dedicated scheme and the group common scheme. For example, the uplink transmission power control unit 220 may specify the uplink power control parameter by L1/L2 control signaling using an uplink power control parameter index, a power offset indicator and/or an uplink power control time domain pattern index.

Next, transmission operations of the uplink power control parameter in accordance with the dedicated scheme according to an embodiment of the present invention are described. In this embodiment, the uplink power control parameter is individually transmitted to the user equipment 100 in the dedicated scheme using the uplink power control parameter index, the power offset indicator and/or the uplink power control time domain pattern index.

Figure 5:
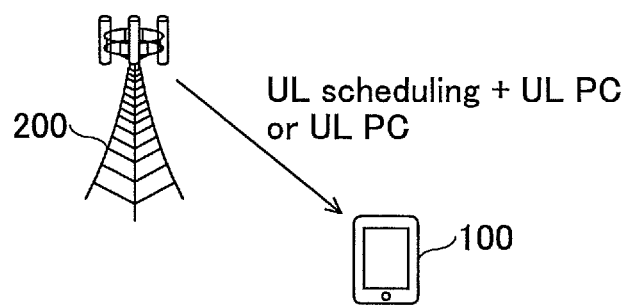
FIG. 5 is a diagram illustrating dedicated downlink control signaling according to an embodiment of the present invention.

Specifically, as illustrated in FIG. 5, the uplink power control parameter index may be individually transmitted to the user equipment 100 by downlink control signaling for uplink scheduling or downlink control signaling dedicated to uplink power control. In the former case, the uplink power control parameter index is transmitted to the user equipment 100 together with uplink scheduling information. In the latter case, the uplink power control parameter index may be transmitted after the uplink scheduling information, and the base station 200 may share uplink/downlink information in the dynamic TDD with an adjacent base station 200' by backhaul signaling to determine an appropriate uplink power control parameter. For example, as illustrated in FIG. 6, after transmitting the uplink scheduling information to the user equipment 100, the base station 200 may exchange uplink/downlink information in the dynamic TDD with the adjacent base station 200', determine an uplink power control parameter based on the uplink/downlink information and transmit the determined uplink power control parameter index to the user equipment 100. For example, when the user equipment 100 is located in a cell edge, the base station 200 may configure lower uplink transmission power for the user equipment 100 so that uplink transmission from the user equipment 100 can be prevented from interfering with downlink transmission toward a user equipment in an adjacent cell.

Furthermore, the uplink power control parameter may be individually transmitted to the user equipment 100 using a power offset (boosting) indicator. Specifically, a flag (accumulation disabling/enabling information) in downlink control signaling may be introduced to enable or disable accumulation of the uplink power control offset. If the accumulation is enabled, the user equipment 100 may accumulate the indicated uplink power control offset to uplink transmission power.

In contrast, if the accumulation is disabled, the user equipment 100 may clear the uplink power control offset accumulated until receiving the flag indicative of the disabling and apply the indicated uplink power control offset as the uplink transmission power. For example, as illustrated in FIG. 7, when the accumulation is disabled (No-accumulation), the transmission power configuration unit 120 clears z dB accumulated up to this time point and configures the uplink transmission power with transmission power resulting from accumulation of the newly indicated uplink power control offset y dB. According to this power control scheme, instantaneous boosting can reduce high interference.

Alternatively, if the accumulation is disabled, the user equipment 100 may ignore only the uplink power control offset being accumulated just before receiving the flag indicative of the disabling and accumulate the indicated uplink power control offset. In other words, the uplink power control offset that has been indicated while receiving the flag is not accumulated. However, the uplink power control offset that had already been accumulated is not cleared. For example, as illustrated in FIG. 8, when the accumulation is disabled (No-accumulation), the transmission power configuration unit 120 accumulates the currently indicated y dB to the uplink power control offset y dB accumulated until the previous accumulation timing. The power control scheme may preferably be applied for restarting closed-looped power control for an uplink slot having less interference.

Furthermore, an uplink power control parameter indicator may be individually indicated to the user equipment 100 using an uplink power control time domain pattern index. The uplink power control time domain pattern index may indicate an uplink power control parameter to be applied for uplink transmission scheduled for a time bitmap. Specifically, as illustrated in FIG. 9A, the uplink power control parameter may be indicated in each bit in the time bitmap having the uplink transmission scheduled. In the depicted example, the uplink power control parameters "x", "y", "x" and "z" are assigned to bits "0", "1", "2" and "3" of the uplink power control parameter, respectively. Alternatively, as illustrated in FIG. 9B, for each uplink power control parameter set, a time index, to which the parameter set is applied, may be transmitted. In the depicted example, the uplink power control parameter set #1 is applied to time indices "0", "2", . . . , the uplink power control parameter set #2 is applied to time indices "1", "5", . . . , and the uplink power control parameter set #3 is applied to time indices "3", "8", . . . .

Figure 10A:
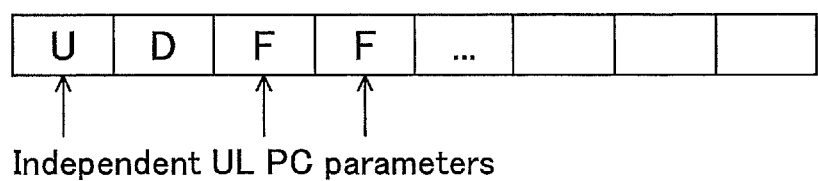
FIG. 10A is a diagram illustrating an uplink power control parameter transmitted in a time domain pattern according to an embodiment of the present invention.
Figure 10B:
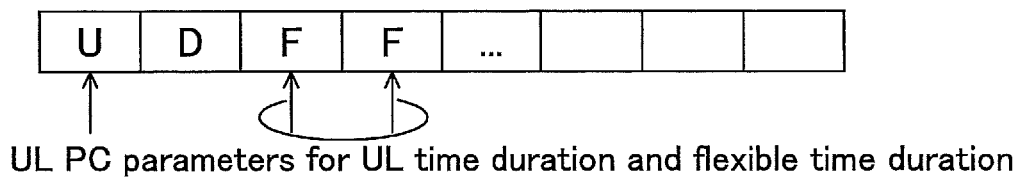
FIG. 10B is a diagram illustrating an uplink power control parameter transmitted in a time domain pattern according to an embodiment of the present invention.

Note that the time unit for the time domain pattern may be configured by a higher layer or may be predefined. Furthermore, only if uplink transmission is performed within a time period, the uplink power control parameter may be transmitted. The uplink power control time domain pattern index may be configured with TDD uplink/downlink configuration, and the uplink power control parameter may be configured for each uplink time index or each flexible time index (if scheduled, it can be scheduled as uplink) for the configured uplink/downlink configuration. For example, as illustrated in FIG. 10A, independent uplink power control parameters may be configured for uplink slots (U) and flexible slots (F). Furthermore, as illustrated in FIG. 10B, a common uplink power control parameter may be configured for two successive flexible slots (F).

Next, transmission operations of uplink power control parameters in accordance with the group common scheme according to an embodiment of the present invention are described. In this embodiment, an uplink power control parameter is collectively transmitted to a group of user equipments 100 in accordance with the group common scheme using an uplink power control parameter index, a power offset (boosting) indicator and/or an uplink power control time domain pattern index. Specifically, an uplink slot type, a power offset indicator, an uplink power control parameter set index or an uplink power control process index is collectively transmitted to the group of user equipments 100, and the respective user equipments 100 in the group set uplink power in accordance with the common uplink slot type, the common power offset indicator, the common uplink power control parameter set index or the common uplink power control process index. For example, as illustrated in FIG. 11, the uplink power control parameter may be collectively transmitted to the group of user equipments 100 by L1/L2 downlink control signaling. According to the group common scheme, by a single group common transmission, uplink power control for a simultaneous uplink transmission group can be allowed. Compared to the above-described dedicated scheme, signaling overhead can be reduced. Note that, for each uplink slot type, the uplink power control parameter may be configured by a higher layer, may be broadcast or predefined.

Furthermore, an uplink/downlink direction and an uplink type may be transmitted in combination. For example, a downlink, uplink type 1, uplink type 2, uplink type 3 and so on may be transmitted. Here, different uplink types may be configured by a higher layer or have predefined relevant uplink power control parameters.

Figure 12A:
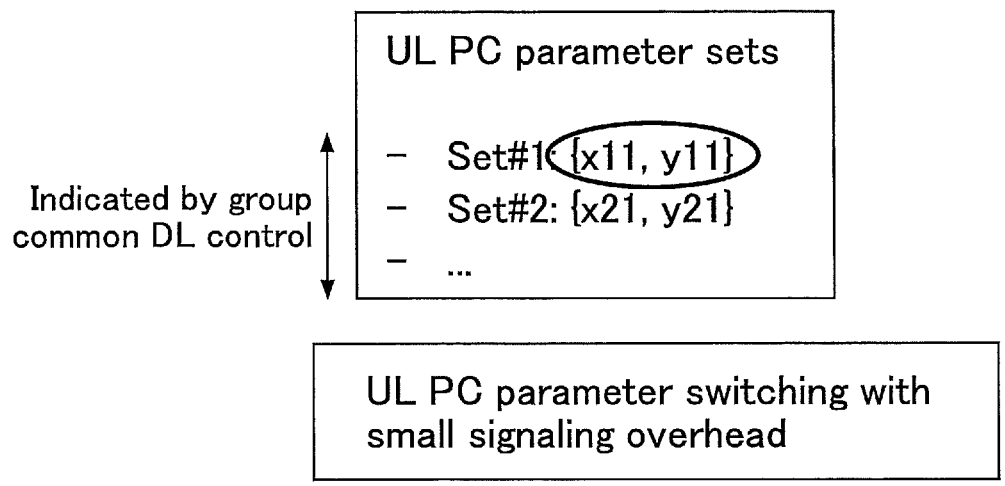
FIG. 12A is a diagram illustrating an uplink power control parameter set index, which is transmitted by a group common scheme according to an embodiment of the present invention.
Figure 12B:
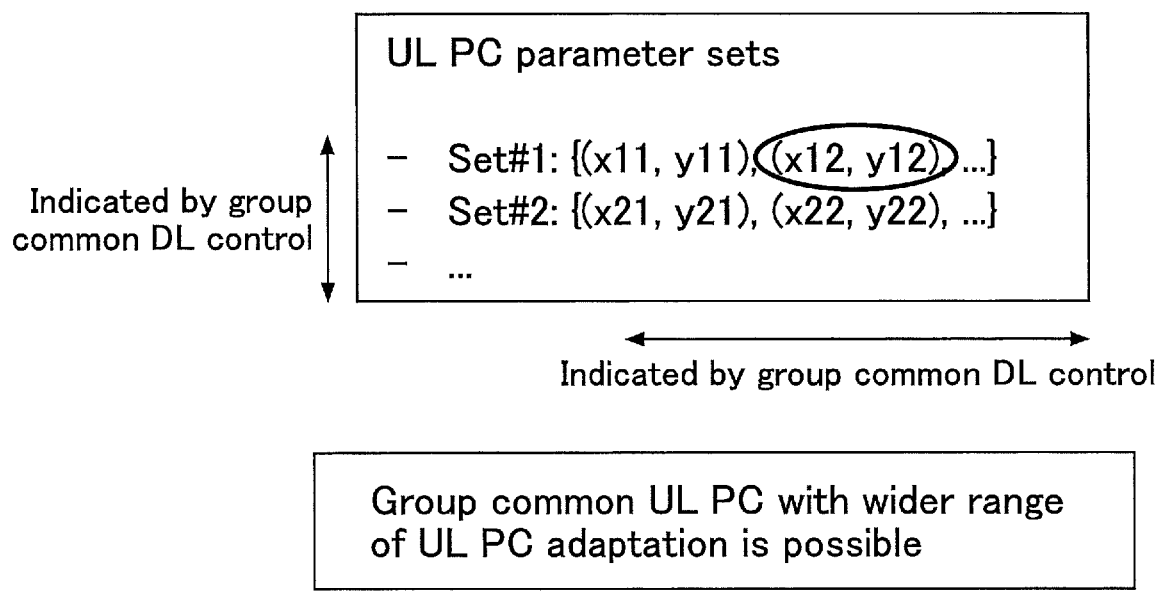
FIG. 12B is a diagram illustrating an uplink power control parameter set index, which is transmitted by a group common scheme according to an embodiment of the present invention.

Furthermore, in the group common scheme, as illustrated in FIG. 12A, each uplink power control parameter set may be associated with an uplink power control parameter, and an uplink power control parameter set index to be applied may be transmitted in accordance with the group common scheme. In the depicted example, the uplink power control parameter set #1 includes uplink power control parameters x11 and y11, and the uplink power control parameter set #2 includes uplink power control parameters x21 and y21. For example, when the uplink power control parameter set #1 is transmitted to a group of user equipments 100 in accordance with the group common scheme, the respective user equipments 100 set uplink transmission power in accordance with the uplink power control parameters x11 and y11. Alternatively, as illustrated in FIG. 12B, the respective uplink power control parameter sets are associated with multiple uplink power control parameters, and an uplink power control parameter set index to be applied and an uplink power control parameter in the corresponding uplink power control parameter set may be indicated in accordance with the group common scheme. In the depicted example, when the uplink power parameter set #1 and the uplink power control parameter (x12, y12) in the uplink power control parameter set #1 are transmitted to the group of user equipments 100 in accordance with the group common scheme, the respective user equipments 100 configure uplink transmission power in accordance with the uplink power control parameters x12 and y12.

Figure 13:
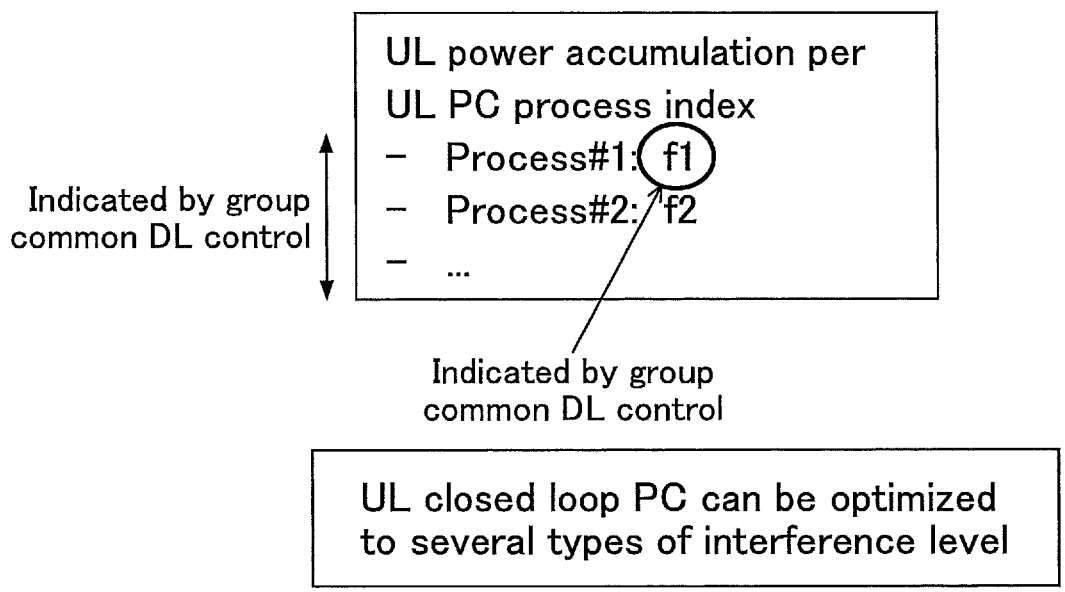
FIG. 13.

Furthermore, as illustrated in FIG. 13, each uplink power control process index may be associated with uplink power accumulation, and the applied uplink power control process index may be indicated in accordance with the group common scheme. In the depicted example, the uplink power control process #1 is associated with uplink power accumulation f1, and the uplink power control process #2 is associated with uplink power accumulation f2. For example, when the uplink power control process #1 is collectively transmitted to the group of user equipments 100 in accordance with the group common scheme, the respective user equipments 100 configure uplink transmission power in accordance with the uplink power accumulation f1.

Figure 14:
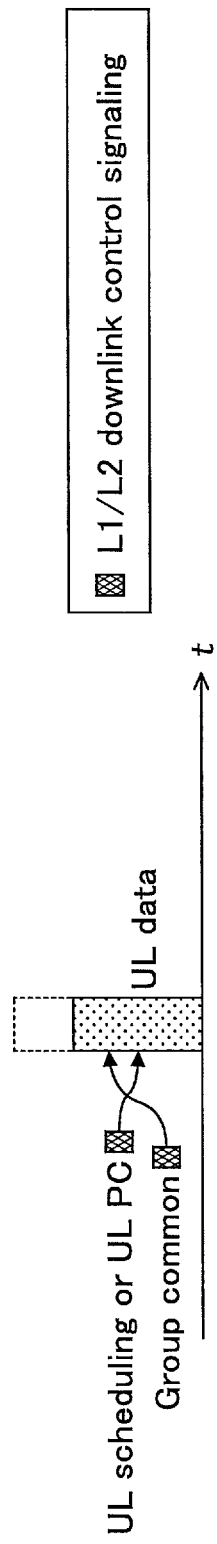
FIG. 14 is a diagram illustrating downlink control signaling based on a combined scheme according to an embodiment of the present invention.

Next, transmission operations of an uplink power control parameter in accordance with the combination of the dedicated scheme and the group common scheme according to an embodiment of the present invention are described. In this embodiment, the uplink power control parameter is indicated to the user equipment 100 with an uplink power control parameter index, a power offset (boosting) indicator and/or an uplink power control time domain pattern index in accordance with the combination scheme of the dedicated scheme and the group common scheme. For example, as illustrated in FIG. 14, a flag for enabling or disabling accumulation for an uplink power control parameter set index, an uplink power control process index or an uplink power offset may be indicated by L1/L2 downlink control signaling in accordance with the group common scheme, and uplink scheduling or an uplink power control parameter index may be indicated to the user equipment 100 individually by L1/L2 downlink control signaling.

Figure 15A:
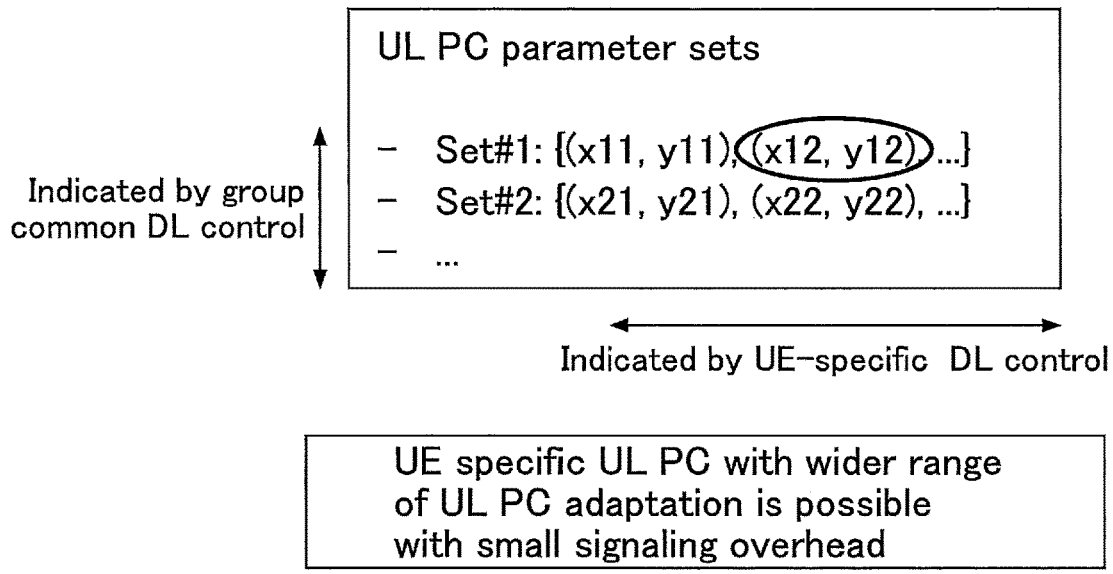
FIG. 15A is a diagram illustrating an uplink power control process index transmitted based on a combined method according to an embodiment of the present invention.

In the combination of the dedicated scheme and the group common scheme, as illustrated in FIG. 15A, each uplink power control parameter set is associated with multiple uplink power control parameters. An uplink power control parameter set index to be applied may be indicated in accordance with the group common scheme, and an uplink power control parameter in the corresponding uplink power control parameter set may be indicated in accordance with the dedicated scheme. In the illustrated example, when the uplink power control parameter set #1 is indicated in accordance with the group common scheme and uplink power control parameters (x12, y12) in the uplink power control parameter set #1 are indicated to the user equipment 100 in accordance with the dedicated scheme, the user equipment 100 configures uplink transmission power in accordance with the uplink power control parameters x12 and y12.

Figure 15B:
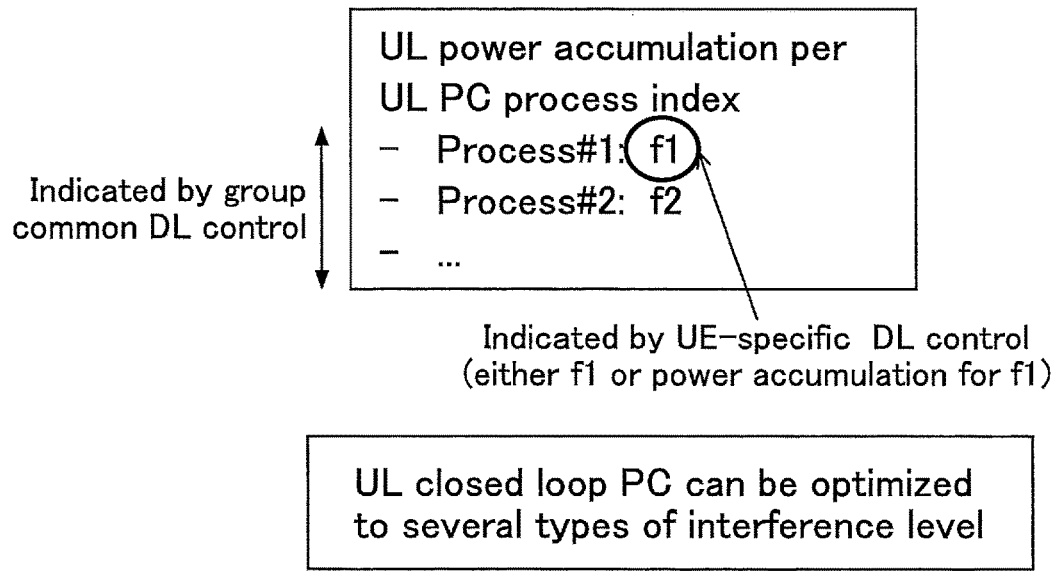
FIG. 15B is a diagram illustrating an uplink power control process index transmitted in a combined method according to an embodiment of the present invention.

Furthermore, as illustrated in FIG. 15B, each uplink power control process index is associated with uplink power accumulation. An uplink power control process index to be applied may be indicated in accordance with the group common scheme, or the uplink power accumulation f1 may be indicated to the user equipment 100 in accordance with the dedicated scheme.

Note that group common downlink control signaling and downlink control signaling specific to the user equipment 100 may include the same or consistent uplink power control parameters. Upon detecting either of these two uplink power control parameters, the user equipment 100 can apply the detected uplink power control parameter.

Furthermore, upon detecting a certain uplink power control parameter in both the group common downlink control signaling and the downlink control signaling specific to the user equipment 100, the user equipment 100 may apply the detected uplink power control parameter in accordance with a predetermined priority. For example, the user equipment 100 may follow the uplink power control parameter indicated in the specific downlink control signaling. This is preferred for the case where different transmission powers are applied to the certain user equipment 100. Alternatively, the user equipment 100 may follow the uplink power control parameter indicated in the group common downlink control signaling. Alternatively, the user equipment 100 may follow the uplink power control parameter indicated in the last received downlink control signaling. Note that this case may be also applied to the case where the user equipment 100 has detected downlink control signalings regardless of the dedicated scheme or the group common scheme, such as detection at the user equipment 100 of two separate downlink control signalings indicative of an uplink power control parameter for the same or temporally overlapping uplink transmission. Alternatively, if the indicated uplink power control parameter is a power offset indicator, the user equipment 100 may accumulate both the power offset indicator indicated by the separate downlink control signaling and the power offset indicator indicated by the group common downlink control signaling.

Furthermore, if the user equipment 100 has failed to detect the group common downlink control signaling, the user equipment 100 may apply a fallback uplink power control parameter. The fallback uplink power control parameter may be configured by a higher layer or may be broadcast or predefined in specifications. One of uplink power control parameter indices can be defined as the fallback uplink power control parameter. For example, when one uplink power control parameter is configured by a higher layer, the base station 200 does not need to transmit group common downlink control signaling to indicate the uplink power control parameter. In this case, the user equipment 100 does not need to monitor the downlink control signaling.

Figure 16A:
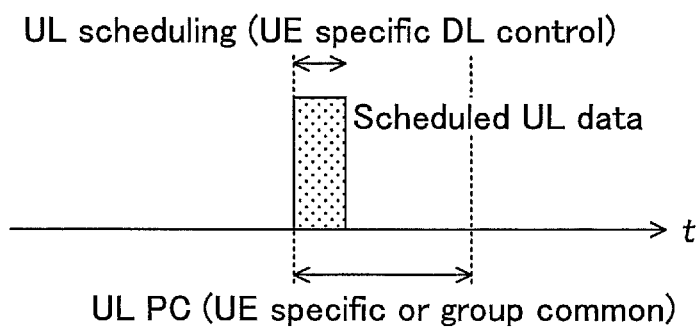
FIG. 16A is a diagram illustrating a temporal relationship between uplink data and uplink power control according to an embodiment of the present invention.
Figure 16B:
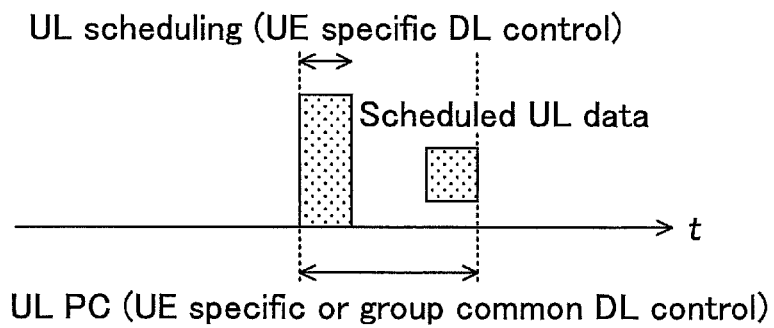
FIG. 16B is a diagram illustrating a temporal relationship between uplink data and uplink power control according to an embodiment of the present invention.

Furthermore, time scales for uplink power control and uplink scheduling can be separate. Specifically, as illustrated in FIGS. 16A and 16B, a time period where an uplink power control parameter indicated in accordance with the dedicated scheme or the group common scheme is applied may include a transmission period of uplink data scheduled in accordance with uplink scheduling indicated in accordance with the dedicated scheme. For example, the uplink power control is indicated for each slot, and the uplink scheduling may be performed at a shorter time period. Accordingly, signaling overhead for uplink power control can be reduced, and some effects such as reduced interference variations in a time domain, improved accuracy of power control at the user equipment 100 or the like can be expected.

Furthermore, for a combination of dynamic uplink power control and time-dependent semi-static uplink power control, the user equipment 100 may prioritize the dynamic uplink power control. For example, if the user equipment 100 is configured with the time-dependent uplink power control such as a slot group, upon receiving an uplink power control parameter in L1/L2 downlink control signaling, the user equipment 100 may update the configured time-dependent uplink power control with the received uplink power control parameter in the L1/L2 downlink control signaling.

Furthermore, for the group common downlink control signaling and/or the separate downlink control signaling, the indication can be interpreted to be specific to the user equipment, for example, configured by a higher layer. For example, if the base station 200 configures either the open-looped power control or the closed-looped power control for the user equipment 100, the user equipment 100 configured with the open-looped power control may interpret the group common downlink control signaling as a parameter set indication for the open-looped power control while the user equipment 100 configured with the closed-looped power control may interpret the group common downlink control signaling as a parameter set indication or a power control process indication for the closed-looped power control. In this manner, one downlink control format can be reused, and overhead of the group common downlink control signaling can be reduced.

Furthermore, the above-described transmission power control can be applied to sidelink, which is direct communication between terminals.

Here, the block diagrams used in the description of the above-described embodiments show blocks for functional units. These functional blocks (components) are implemented in any combination of hardware and/or software items. Furthermore, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 17:
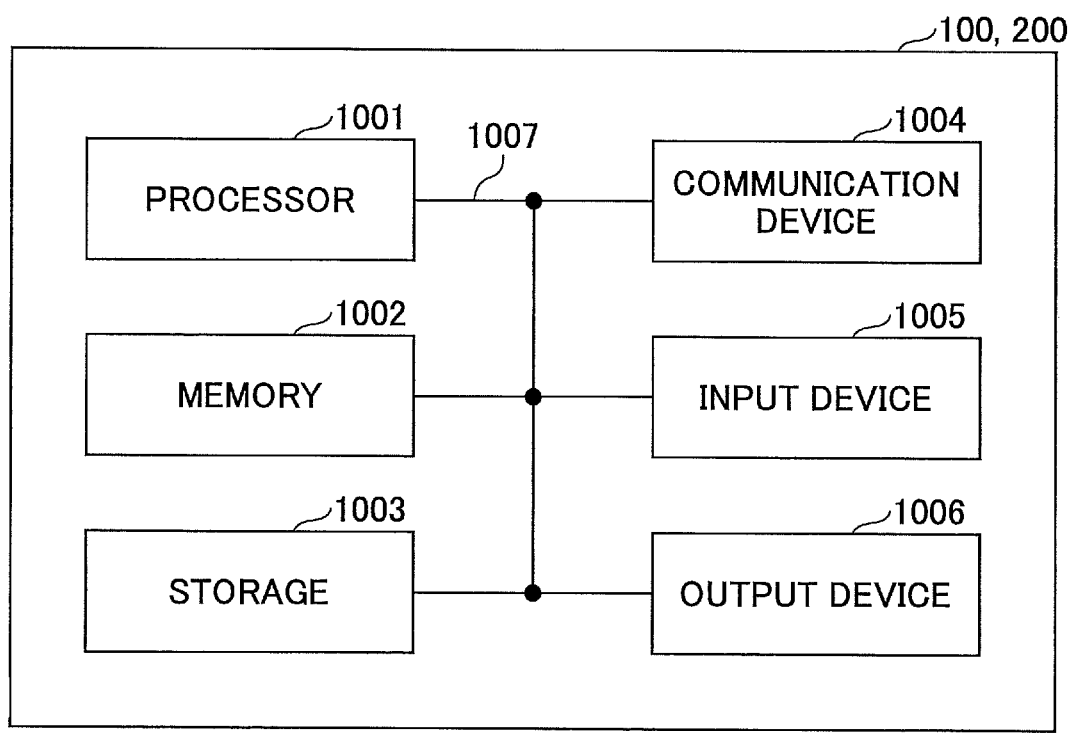
FIG. 17 is a block diagram illustrating a hardware configuration of a user equipment and a base station according to an embodiment of the present invention.

For example, the user equipment 100 and the base station 200 according to an embodiment of the present invention may function as a computer processing the radio communication method according to the present invention. FIG. 17 is a block diagram for illustrating a hardware configuration of the user equipment 100 and the base station 200 according to an embodiment of the present invention. Each of the above-described user equipment 100 and base station 200 may be physically configured as a computer device including a processor 1001, a memory 1002, a storage 1003, a communication device 1004, an input device 1005, an output device 1006, a bus 1007 or the like.

Note that the language "apparatus" can be interchangeably read as a circuit, a device, a unit or the like. The hardware configuration of the user equipment 100 and the base station 200 may each be arranged to include one or more of the illustrated devices or without including a part of the devices.

Respective functions in the user equipment 100 and the base station 200 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1001 may be arranged with a central processing unit (CPU) including an interface with a peripheral device, a control device, a calculation device, a register and the like. For example, the above-described components may be implemented in the processor 1001.

Furthermore, the processor 1001 loads programs (program codes), software modules and data from the storage 1003 and/or the communication device 1004 into the memory 1002 and executes various operations in accordance with them. As the programs, programs for causing the computer to perform at least a part of operations as described in the above embodiments are used. For example, operations by the components in the user equipment 100 and the base station 200 may be implemented with control programs stored in the memory 1002 and executed by the processor 1001, and other functional blocks may be similarly implemented. It is described that the above-described various processes are executed by the single processor 1001. However, they may be executed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a ROM (Read Only Memory), an EPROM (Erasable Programmable ROM), an EEPROM (Electrically Erasable Programmable ROM), a RAM (Random Access Memory) or the like, for example. The memory 1002 may be referred to as a register, a cache, a main memory (main storage device) or the like. The memory 1002 can store programs (program codes), software modules or the like that can be executed to implement the radio communication method according to an embodiment of the present invention.

The storage 1003 is a computer-readable storage medium and may be arranged with at least one of an optical disk such as a CD-ROM (Compact Disc ROM), a hard disk drive, a flexible disk, a magnetic optical disk (for example, a compact disk, a digital versatile disk, a Blu-ray (registered trademark) disk), a smart card, a flash memory (for example, a card, a stick, a key drive), a floppy (registered trademark), a magnetic strip or the like. The storage 1003 may be referred to as an auxiliary storage device. The above-described storage medium may be a database or a server including the memory 1002 and/or the storage 1003 or any other appropriate medium.

The communication device 1004 is a hardware item (transceiver device) for communication over computers via a wired and/or wireless network and may be also referred to as a network device, a network controller, a network card, a communication module or the like. For example, the above-described components may be implemented in the communication device 1004.

The input device 1005 is an input device for receiving external inputs (for example, a keyboard, a mouse, a microphone, a switch, a button, a sensor or the like). The output device 1006 is an output device for providing external outputs (for example, a display, a speaker, a LED ramp or the like). Note that the input device 1005 and the output device 1006 may be integrally arranged (for example, a touch panel).

Furthermore, the respective devices such as the processor 1001 and the memory 1002 are connected with each other via the bus 1007 for communicating information. The bus 1007 may be arranged with a single bus or different buses for different devices.

Furthermore, the user equipment 100 and the base station 200 may be arranged to include a hardware item such as a macro processor, a digital signal processor (DSP), an ASIC (Application Specific Integrated Circuit), a PLD (Programmable Logic Device), a FPGA (Field Programmable Gate Array) or the like, and a part or all of the functional blocks may be implemented in the hardware item. For example, the processor 1001 may be implemented with at least one of these hardware items.

Transmission of information is not limited to the embodiments/implementations as described in the present specification and may be made in any other manner. For example, information may be transmitted in physical layer signaling (for example, DCI (Downlink Control Information) and UCI (Uplink Control Information)), higher layer signaling (for example, RRC (radio Resource Control) signaling, MAC (medium Access Control) signaling, broadcast information (MIB (master Information Block) and SIB (System Information Block)) or any other signal or combinations thereof. Furthermore, the RRC signaling may be referred to as an RRC message and may be an RRC Connection Setup message, an RRC Connection Reconfiguration message or the like.

The respective embodiments/implementations as described in the present specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations as described in the present specification may be permutable, as long as there is not inconsistency. For example, for methods as described in the present specification, various steps are presented in an exemplary order, and the present invention is not limited to the presented certain order.

Certain operations performed by the base station 200 as described in the present specification may be performed by its upper node in some cases. In a network including one or more network nodes having base stations, various operations performed to communicate with terminals may be apparently performed by the base stations and/or network nodes other than the base stations (for example, a MME or an S-SW can be assumed, but the network nodes are not limited to them). Although it has been described that the single network node other than the base stations is used in the above example, combinations of multiple other network nodes (for example, an MME and an S-GW) may be used.

Information and others may be output from a higher layer (or a lower layer) to a lower layer (or a higher layer). They may be input and output via multiple network nodes.

Incoming and outgoing information and others may be stored in a certain location (for example, a memory) and/or managed in a management table. The incoming and outgoing information and others may be overwritten, updated or added. The outgoing information and others may be deleted. The incoming information and others may be transmitted to other device.

Determination may be made with a one-bit value (0 or 1), a Boolean value (true or false) or numerical comparison (for example, comparison with a predetermined value).

The embodiments/implementations as described in the present specification may be used singularly or in combinations or switched in connection with execution. Furthermore, indication of predetermined information (for example, indication "it is X") is not limited to explicit manners and may be performed implicitly (for example, the predetermined information is not indicated).

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any restriction to the present invention.

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Furthermore, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terminologies described in the present specification and/or terminologies required to understand the present specification may be replaced with terminologies having the same or similar meanings. For example, a channel and/or a symbol may be a signal. Furthermore, the signal may be a message. Furthermore, a component carrier (CC) may be referred to as a carrier frequency, a cell or the like.

The terminologies "system" and "network" for use in the present specification are interchangeably used.

Furthermore, information, a parameter and so on as described in the present specification may be represented with an absolute value, a relative value from a predetermined value or other corresponding information. For example, a radio resource may be specified with an index.

Names as used for the above-described parameters are not restrictive from any standpoint. Furthermore, there are some cases where formulae and so on using these parameters may be different from ones as explicitly disclosed in the present specification. Various channels (for example, a PUCCH, a PDCCH or the like) and information elements (for example, a TPC or the like) can be identified with any preferred names, and the various names assigned to these various channels and information elements are not restrictive from any standpoint.

A base station can accommodate one or more (for example, three) cells (also referred to as sectors). If the base station accommodates multiple cells, the whole coverage area of the base station can be segmented into multiple smaller areas, and the respective smaller areas can provide communication services with a base station subsystem (for example, indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terminologies "determining" as used in the present specification may include various operations. The "determining" may include calculating, computing, processing, deriving, investigating, looking up (for example, looking up a table, a database or other data structures) and ascertaining, for example. Furthermore, the "determining" may include receiving (for example, receiving information), transmitting (for example, transmitting information), inputting, outputting and accessing (for example, accessing data in a memory). Furthermore, the "determining" may include resolving, selecting, choosing, establishing, comparing or the like. In other words, the "determining" may include any operation.

The terminologies "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (both visible and invisible) domain.

A reference signal can be omitted as a RS (Reference Signal) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The terminology "means" in an arrangement of each apparatus as stated above may be replaced with "unit", "circuit", "device" or the like.

As long as the terminologies "include", "including" and variations thereof are used in the present specification or claims, these terminologies are intended to be inclusive similar to the terminology "comprising". Furthermore, the terminology "or" as used in the present specification or claims is intended not to be an exclusive OR.

A radio frame may be arranged with one or more frames in a time domain. In the time domain, one or more frames each may be referred to as a subframe. The subframe may be further arranged with one or more slots in the time domain. The slot may be further arranged with one or more symbols (OFDM symbols, SC-FDMA symbols and so on) in the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (frequency bandwidths, transmission power and so on available in the mobile station) to mobile stations. The minimum time unit for scheduling may be referred to as a TTI (Transmission Time Interval). For example, one subframe, multiple contiguous subframes or one slot may be referred to as the TTI. A resource block (RB) may be a resource assignment unit in the time domain and the frequency domain and may include one or more contiguous subcarriers in the frequency domain. Furthermore, in the time domain, the resource block may include one or more symbols and have one slot, one subframe or one TTI in length. The single TTI and subframe each may be arranged with one or more resource blocks. The above-described arrangement of radio frame is merely exemplary, and the number of subframes in the radio frame, the number of slots in the subframe, the number of symbols and resource blocks in the slot and the number of subcarriers in the resource block can be changed in any manner.

The embodiments of the present invention are described in detail above. However, the present invention is not limited to the above-described specific embodiments, and various modifications and variations can be made within the gist of the present invention as recited in claims.

LIST OF REFERENCE SYMBOLS 10 radio communication system
100 user equipment
110 transmission and reception unit
120 transmission power configuration unit
200 base station
210 communication control unit
220 uplink transmission power control unit

The invention claimed is:

1. A terminal, comprising:
a transmission power configuration unit that configures transmission power of an uplink data signal based on power control parameters for target reception power and a path loss that are individually indicated from a base station apparatus to the terminal using downlink control signaling dedicated to power control; and
a transmission and reception unit that transmits the uplink data signal to the base station apparatus,
wherein, when downlink control information for uplink scheduling that is individually indicated to the terminal includes an indication for the power control parameters, the transmission power configuration unit configures the transmission power of the uplink data signal based on the downlink control signaling dedicated to power control and the indication by the downlink control information for the uplink scheduling, and
wherein the power control parameters for the target reception power and the path loss are associated with a single uplink power control parameter index.

2. The terminal as claimed in claim 1, wherein the downlink control signaling dedicated to power control is Radio Resource Control signaling.

3. The terminal as claimed in claim 1, wherein, when the indication for the power control parameters is made using the downlink control information for the uplink scheduling after the indication for the power control parameters is made using the downlink control signaling dedicated to power control, the transmission power configuration unit configures the transmission power of the uplink data signal based on the power control parameters indicated using the downlink control information for the uplink scheduling.

4. The terminal as claimed in claim 2, wherein, when the indication for the power control parameters is made using the downlink control information for the uplink scheduling after the indication for the power control parameters is made using the downlink control signaling dedicated to power control, the transmission power configuration unit configures the transmission power of the uplink data signal based on the power control parameters indicated using the downlink control information for the uplink scheduling.

5. A communication method by a terminal, comprising:
a transmission power configuration step of configuring transmission power of an uplink data signal based on power control parameters for target reception power and a path loss that are individually indicated from a base station apparatus to the terminal using downlink control signaling dedicated to power control; and
a transmission step of transmitting the uplink data signal to the base station apparatus,
wherein, when downlink control information for uplink scheduling that is individually indicated to the terminal includes an indication for the power control parameters, the transmission power configuration step configures the transmission power of the uplink data signal based on the downlink control signaling dedicated to power control and the indication by the downlink control information for the uplink scheduling, and
wherein the power control parameters for the target reception power and the path loss are associated with a single uplink power control parameter index.

6. A base station comprising:
a transmitter that transmits, using downlink control signaling dedicated to power control, power control parameters for target reception power and a path loss to a terminal individually; and
a receiver that receives an uplink data signal transmitted with transmission power configured by the terminal based on the power control parameters,
wherein, when downlink control information for uplink scheduling that is individually indicated to the terminal includes an indication for the power control parameters, the transmission power of the uplink data signal is configured by the terminal based on the downlink control signaling dedicated to the power control and the indication by the downlink control information for the uplink scheduling, and
wherein the power control parameters for the target reception power and the path loss are associated with a single uplink power control parameter index.

* * * * *